May 27, 1969  C. E. JUSTIS, SR  3,445,864
FLUSH TANK VALVE BALL AND ROD COUPLING INSERT
Filed Oct. 6, 1966

INVENTOR
Charles E. Justis, Sr.

BY Shoemaker and Mattare
ATTORNEYS

United States Patent Office 3,445,864
Patented May 27, 1969

3,445,864
FLUSH TANK VALVE BALL AND ROD
COUPLING INSERT
Charles E. Justis, Sr., 825 Greenwood Ave.,
Jenkintown, Pa. 19046
Filed Oct. 6, 1966, Ser. No. 584,752
Int. Cl. E03d 1/34
U.S. Cl. 4—56                                  7 Claims

ABSTRACT OF THE DISCLOSURE

The flush tank valve ball comprises a hollow body substantially ovate in vertical, axial cross sectional configuration and an upper or head portion and a downwardly extending tail portion. The tail portion is receivable in the open end of the flush tank drain pipe. The head portion has a wide encircling flange extending generally in a plane normal to the body axis and defines a plane separating the head portion from the tail portion. The underside of the flange curves outwardly and downwardly and forms a downwardly opening annular sealing surface concave in transverse cross section.

---

This invention relates generally to improvements in toilet flush tank equipment and is directed particularly to improvements in flush tank valve balls and seating elements therefor.

The invention is also directed to improvements in coupling inserts for flush tank valve balls such as might be formed of rubber or plastic, particularly a relatively soft or resilient rubber or plastic, in which is embedded an insert formed to facilitate attaching to or coupling with the ball the usual or conventional support rod by means of which the ball is lifted from its seat in the operation of a mechanism for opening the tank outlet.

A further object of the invention is to provide an improved flush tank valve ball of novel form or shape for the introduction of a lower end portion thereof into the upwardly opening flush tank outlet pipe whereby a specially formed shoulder portion of the ball may come to rest either upon the edge of the open end of the discharge pipe or upon an annular seat element mounted upon the open end of the discharge pipe, for shutting off passage of water from the tank into the discharge pipe.

Still another object of the invention is to provide a flush tank valve ball formed in a novel manner whereby in the operation of closing off the open end of the flush tank outlet pipe, pressure applied to the ball facilitates the firm seating of the same in its closed position.

Still another object of the invention is to provide a flush tank valve ball and seat forming collar wherein the seat forming collar is designed to rest upon the top end edge of the tank outlet pipe and the tank valve ball is provided with a novel encircling sealing shoulder having an underface formed to have sealing contact with the sealing collar when a lower end portion of the tank valve ball moves downwardly through the collar and into the open upper end of the tank outlet pipe.

The flush tank valve ball of the present invention is designed to be molded of a suitable elastomer such as rubber or a suitable synthetic resin plastic and it is an additional object of the invention to provide a novel form of coupling insert designed to be embedded in the top central portion of the valve ball to provide a means for effecting the threaded attachment to the valve ball of a suspension rod, such coupler having a novel form which insures its permanent retention in the elastomer material of the ball, by reason of the flanged formation of such insert which resists the pulling of the insert out of the elastomer material.

It is a still further object of the invention to provide a new and novel form of flush tank valve ball having a certain length and embodying a lower end portion of tapering form and having an inwardly curving surface whereby the passage of water therearound as it flows into the outlet pipe will function to center the valve ball and thereby insure its proper movement into the outlet pipe and the proper seating of a flanged portion encircling the upper part of the ball, onto a seating collar or onto the edge of the outlet pipe.

The invention will be best understood from a consideration of the following detailed description taken in connection with the accompanying drawings forming a part of the specification, wherein.

Figure 1:
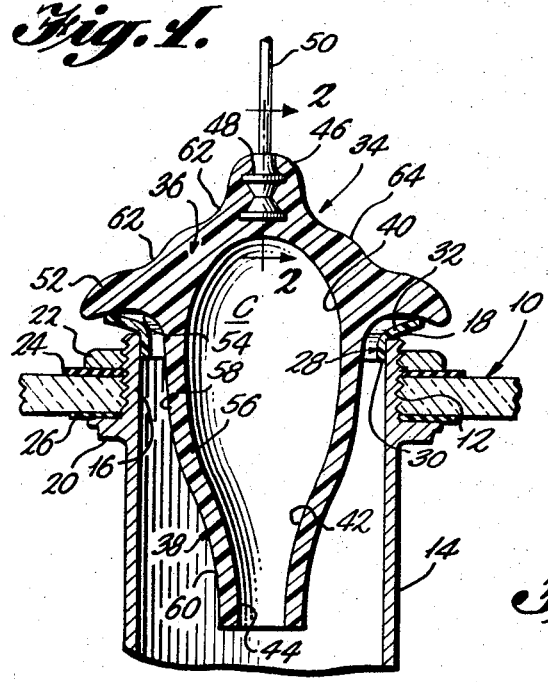
FIG. 1 shows a valve tank ball constructed or formed in accordance with a preferred embodiment of the present invention, the view being a longitudinal section through the valve ball and the valve ball being in a partially closed position within the open top end of a flush tank outlet pipe which is also illustrated in longitudinal section together with an adjacent portion of a tank bottom wall.

Referring now more particularly to the drawing wherein like numerals of reference designate corresponding parts throughout the several views, for the purpose of illustrating the application of the present invention there is shown in FIG. 1 a portion of the bottom of a toilet flush tank, such bottom portion being generally designated 10 and having therein the opening 12 through which extends the upper end portion of an outlet pipe 14.

The upper end portion of the outlet pipe is designated 16 and spaced downwardly from the top edge of such portion, which is designated 18, is the integral collar 20 which, when the portion 16 of the pipe is extended through the opening 12, bears against the underside of the tank bottom.

The portion 16 of the outlet pipe is exteriorly screw threaded as shown to receive a securing nut 22 which bears against the top surface of the tank bottom and draws the collar flange 20 upwardly into tight contact with the tank bottom and it will be understood that for securing a leakproof connection suitable gaskets 24 and 26 may be positioned between the top and bottom surfaces of the tank bottom and the flange 20 and nut 22 as shown.

The numeral 28 generally designates the ball seat collar mounted as illustrated upon the top end of the upper portion 16 of the pipe 14. This collar 28 has a short annular lower end portion 30 which fits within the top end of the portion 16 and joins an upwardly and outwardly flaring, relatively wide top portion 32 having a slightly curved or upwardly bowed top surface as shown.

This wide flaring top portion 32 of the ball seat collar is designed to coact with a portion of the tank valve ball as hereinafter described.

The numeral 34 generally designates the improved flush tank valve ball of the present invention.

This valve ball preferably is to be formed of a suitable plastic or rubber and it has a certain substantial length and embodies, as illustrated, an upper or head portion which is generally designated 36 and the relatively long downwardly tapering lower end or tail portion which is generally designated 38.

The valve ball is hollow as illustrated and the hollow interior is of substantially ovate form or configuration. The large diameter end of the long substantially ovate hollow chamber is designated 40 while the tapering lower end portion of this chamber is designated 42 and this leads into the relatively narrow or tubular neck portion 44.

The hollow ovate chamber formed within the valve ball is generally designated C.

Rising from the top of the head 36 is the short thick stud 46 in which is embedded a coupling insert 48 formed for attachment to an end of a carrying or supporting rod 50.

The lower part of the head 36 is defined by the relatively wide encircling flange 52. This flange tapers off to a comparatively thin edge and the underside thereof curves inwardly and upwardly as indicated at 54. This upwardly and inwardly curving undersurface 54 of the flange 52 then continues to curve downwardly into the outer surface of the wall portion of the chamber C.

The wall portion of the chamber C, below the flange 52, is designated 56 and the outer surface of the wall portion is outwardly bowed as indicated at 58 through substantially half the length of the tail portion 38 and then flows into an inwardly curved or bowed terminal part as indicated at 60. As shown, the inner and outer curved portions or surface portions of the wall 56 and the inner surface of the chamber are substantially parallel and the wall 56 of the chamber is relatively thin from the flange 52 to the lower end of the same.

The overall diameter of the flange 52 is materially greater than the diameter of the top portion of the ball seat collar 28 as shown. Thus when the lower end or tail portion of the ball is introduced into the upper end of the pipe 14, the upwardly curving portion 56 of the flange 52 can come to rest upon the upwardly curved surface of the top portion 32 of the seat collar and the flexible nature of the material of the ball will cause the top surface of the portion 32 of the seat collar and the surface 54 of the flange to come together under the pressure of the water in the tank thereby forming a secure or tight seal.

While the collar 28 has been designated as a seat for the flange 52, the top edge 18 of the pipe 14 may also function as a seat in place of the collar 28 if desired. In such a case, it will be obvious that the surface 54 would come to bear upon the seat forming top edge 18 of the pipe 14 in the closing of the valve ball.

The top of the head portion 36 of the ball between the stud 46 and the flange 52 preferably is contoured to provide, as shown, the annular depressions 62 separated by the annular ridge 64. The downwardly tapering configuration of the tail portion 38 of the valve ball as the effect of keeping the valve ball centered as the tail portion descends into the open top end of the pipe 14, by reason of the flowing of water downwardly into the pipe around the tail portion. Thus the sealing undersurface of the flange 52 will come onto the surface of the seat collar at once rather than by touching first at one side and then closing down against the seat all around.

Figure 2:
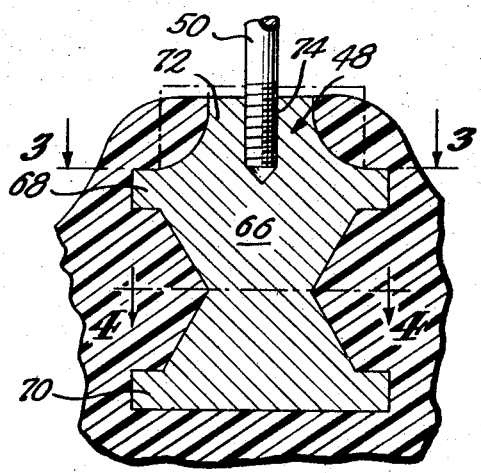
FIG. 2 is a sectional view taken substantially on the line 2—2 of FIG. 1 and on an enlarged scale.
Figure 3:
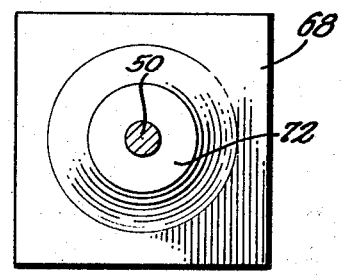
FIG. 3 is a transverse section taken substantially on the line 3—3 of FIG. 2 perpendicular to the axis of the ball insert.
Figure 4:
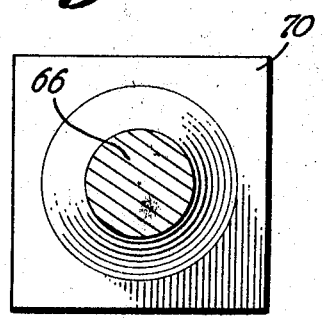
FIG. 4 is a transverse section taken substantially on the line 4—4 of FIG. 2, also perpendicular to the longitudinal axis of the insert.

The coupling insert generally designated 48 may be formed of suitable material, preferably of a suitable non-rusting metal. The insert as shown in FIGS. 1 and 2 has a body 66 having top and bottom ends defined by the flanges 68 and 70 of polygonal outline, preferably square as shown in FIG. 3 while the portion of the body between the flanges is of circular cross section as shown in FIG. 4 and is of small diameter in the middle portion thereof and increases in diameter outwardly from the middle portion whereby the part of the body between the flanges is of double frustoconical configuration having the smaller diameter portions of the frustums joined as shown.

The top portion of the body 66 extends upwardly in the neck portion 72 and in this neck portion there is formed the threaded socket 74 for the reception of the threaded end of the rod 50 hereinbefore referred to.

Figure 5:
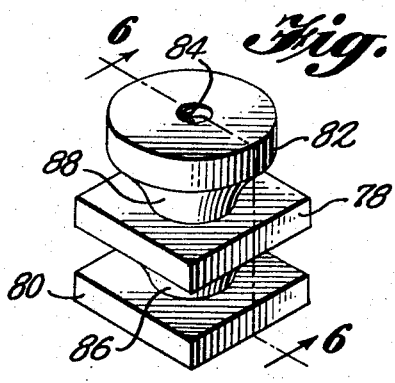
FIG. 5 is a perspective view of a rod coupling insert of a somewhat different form than that shown in FIGS. 1 and 2.
Figure 6:
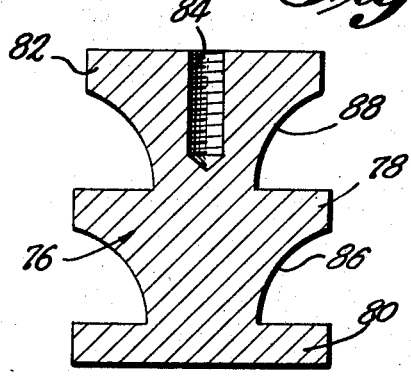
FIG. 6 is a sectional view taken substantially on the line 6—6 of FIG. 5.

An alternative form of the coupling insert is illustrated in FIGS. 5 and 6 wherein the one-piece body of the insert is generally designated 76 with the spaced portions 78 and 80 of polygonal contour or outline and the top portion 82 of circular form in which the threaded socket 84 is formed for the reception of the carrying rod 50. Between the portions 80 and 78 the body is of circular cross section and the side thereof curves upwardly and outwardly as indicated at 86 and between the portions 78 and 82 the intermediate part of the body has similarly outwardly and upwardly curved wall surface 88 of circular cross section. Thus the body is divided into the two parts each of circular cross sectional design with inwardly curving walls forming recesses between the encircling flange portions 78 and 80 and between the portion 82 and 78 as shown.

It will be readily obvious from the foregoing that due to the formation of the coupling inserts where there are flanges separated by constricted portions of the bodies, when the inserts are embedded in the material of the valve ball with the top surfaces of the upper end portions of the inserts flush with the top of the stud 46, the insert cannot be pulled out of or away from the material of the ball.

From the foregoing it will be apparent that there is provided by the present invention a new and novel type of flush tank valve ball having many improvement features over valve balls of the type presently available.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A flush tank valve ball comprising a body of an elastomer having a certain length, the body being substantially ovate in configuration in vertical axial cross section and having an upper or head portion and a downwardly extending tail portion adapted to enter the open top end of a flush tank drain pipe, said head portion having a relatively wide encircling flange extending generally in a plane normal to the body axis defining a plane of separation between the head portion and the tail portion, the underside of said flange curving outwardly and downwardly and forming a downwardly opening anular sealing surface concave in said axial cross section and adapted for sealing engagement upon a seat, said tail portion having a tapering form from the said flange to the lower end thereof operating as a guide for reseating said valve ball, and means carried by the top of said head portion on the longitudinal center of the body for coupling a suspension rod to said body, said body having a chamber therein extending from within the said head portion through the length of said tail portion to and opening through the end of the tail portion.

2. The invention according to claim 1, wherein the said chamber has a wall surface substantially paralleling and lying relatively close to the exterior surface of the tapering tail portion whereby the said tail portion has a relatively thin wall structure.

3. The invention according to claim 1, wherein the said tail portion is of circular cross section and is longitudinally outwardly bowed through approximately half the length thereof from the upper end and then continues downwardly in an inward bow to its lower end, and wherein the said chamber has a wall surface substantially paralleling and lying relatively close to the exterior surface of the tapering tail portion, whereby the tail portion has a relatively thin wall structure.

4. The invention according to claim 1, in combination with an annular ball seat collar adapted to have said tail portion extended therethrough, said seat collar having a relatively wide top portion having a transversely convex top seating surface and a lower portion adapted for coupling the collar to and in concentric relation with the open end of a drain pipe and said concave underside of said flange and the convex top seating surface of said collar being so dimensioned diametrically as to assume a seating operative engagement one with the other.

5. The invention according to claim 1, wherein the said means comprises a rigid body having a certain length embedded in the elastomer material of said head coaxially with the ball body, said rigid body having a constricted portion intermediate its ends of circular cross section located between portions of polygonal contour and having a width materially greater than the diameter of said portion of circular cross section, and said rigid body having a threaded socket directed axially thereof in one end for receiving a threaded end of a suspension rod.

6. The invention according to claim 1, wherein said means comprises a rigid body having a certain length embedded in the elastomer, said body having flat end portions of polygonal contour and a mid-portion of double frustoconical form in which the apical ends of the frustums join and the base ends join said flat end portions, said flat end portions having a width materially greater than the major diameter of said mid-portion, one of said flat end portions having a relatively small diameter axially extending post having therein an axial threaded socket. for receiving an end of a suspension rod.

7. The invention according to claim 1, wherein said means comprises a rigid body having a certain length embedded in the elastomer, having top and bottom end portions and an intermediate portion, said portions each having a flat top surface, and said bottom portion having a flat bottom side, said bottom and intermediate portions being of polygonal contour and said top portion being of circular contour, said bottom and intermediate portions and said intermediate and top portions being joined by circular upwardly and outwardly flaring connecting portions, and said circular top portion having therein an axially directed threaded socket for receiving an end of a suspension rod.

References Cited

UNITED STATES PATENTS

| | | | |
|---|---|---|---|
| 1,592,570 | 7/1926 | Shook | 4—56 |
| 1,682,306 | 8/1928 | Pierson | 4—56 |
| 1,688,877 | 10/1928 | Palmer | 4—56 |
| 1,937,440 | 11/1933 | Schacht | 4—56 |
| 2,035,626 | 3/1936 | Walker | 4—46 |
| 2,557,743 | 6/1951 | Howe | 4—56 |
| 2,639,438 | 5/1953 | Hertzberg | 4—56 |
| 2,693,600 | 11/1954 | Kass | 4—56 |
| 3,060,451 | 10/1962 | Schulhoff | 4—56 |
| 3,086,218 | 4/1963 | Gross | 4—56 |
| 3,148,381 | 9/1964 | Morales | 4—56 |

LAVERNE D. GEIGER, *Primary Examiner.*

D. MASSENBERG, *Assistant Examiner.*